(No Model.)
J. DRIVER.
VEHICLE WHEEL.
No. 458,999. Patented Sept. 8, 1891.
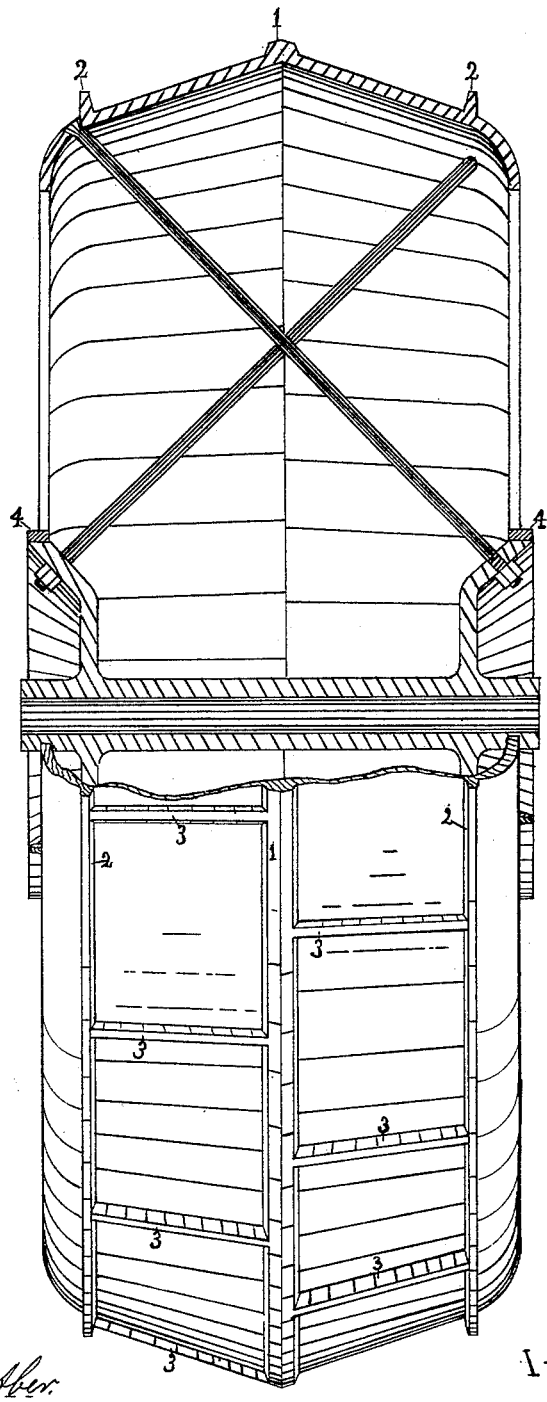
Witnesses:
Bertram E. Aber
Thos. Driver
Inventor.
John Driver

UNITED STATES PATENT OFFICE.

JOHN DRIVER, OF SAN LEANDRO, CALIFORNIA.

VEHICLE-WHEEL.

SPECIFICATION forming part of Letters Patent No. 458,999, dated September 8, 1891.

Application filed October 31, 1890. Serial No. 369,907. (No model.)

*To all whom it may concern:*

Be it known that I, JOHN DRIVER, of San Leandro, in the county of Alameda and State of California, have invented a new Wheel, of which the following is a specification.

The object of my invention is to make a wide wheel that will carry a heavy weight, turn a corner easily, and at the same time be strong and rigid and run smoothly over hard ground with a firm hold and over soft ground without getting dirt in the wheel.

The accompanying drawing is a face elevation with part of the rim removed, showing the upper part of the rim and hub in sections. The rim is made of cast metal, with the ribs and grips all cast together. The edges of the rim are turned inwardly, thus forming sides to keep out the dirt when traveling over soft ground. The center of the rim is larger in diameter with the inside made to correspond. This form makes it strong and rigid without adding much to its weight and also allows it to turn a corner easily. The hub is held in place with wrought-metal spokes extending through holes in the rim and held with a head on the outside and through holes in the flanges of the hub and held with a screw and nut screwed against the inside of the flanges. It will be seen that the spokes cross from one side of the rim to the flange of the hub on the opposite side, thus bracing the rim sidewise with a tension strain on the spokes. On the face of the rim is cast annular ribs 1 and 2 and between them grips 3. These ribs and grips are in such a form as will hold to the ground and run smoothly, and are made together with the rim in one piece, thus making it stronger. This form of rim may be made without the ribs and grips, and the exact shape may be modified, all of which will be set forth in the claims. Around the flanges of the hub I shrink wrought-iron bands 4 to strengthen the hub.

Having thus described my invention, what I claim as new, and desire to secure by Letters Patent, is—

1. A traction-wheel with the center circumference of the rim larger in diameter than the sides and with the sides curved in toward the axle, with the ribs and grips on the face of the rim, in combination with the hub and wrought-metal rings and wrought-metal crossed spokes.

2. A traction-wheel with the center circumference of the rim larger in diameter than the sides and with the sides curved inwardly toward the axle, with a rib on the center circumference and a rib on each side of the center, and grips between the ribs, in combination with the wrought-metal rings on the hub and wrought-metal tension-spokes.

3. A traction-wheel with wrought-metal spokes and a cast hub, in combination with a rim graduated on the face from a larger diameter to a smaller diameter and with a corresponding shape on the inside, with the sides extending inwardly, forming flanges and the annular ribs, and the grips alternately between the ribs on the face of the rim, and all cast together, as shown and described, and for the purpose specified.

4. A wheel with wrought-metal crossed spokes and a cast hub, in combination with a rim graduated on the face from a larger diameter at the center circumference to a smaller diameter on each side of the center, and with a corresponding shape on the inside, and the sides extending inwardly, forming flanges, for the purpose specified, and cast together with the rim in one piece.

5. A traction-wheel with wrought-metal spokes and a cast hub, in combination with a rim graduated on the face from a larger diameter at the center circumference to a smaller diameter on each side of the center, and with a corresponding shape on the inside, and all cast together with the annular ribs and grips on the face of the rim.

6. A wheel with wrought-metal spokes and a cast hub, in combination with a rim graduated on the face from a larger diameter at the center circumference to a smaller diameter on each side of the center, and with the sides extending inwardly, forming flanges, and cast together with the rim, for the purpose specified.

7. A wheel with wrought-metal crossed spokes and a cast hub, as shown, in combination with a rim graduated on the face from a larger diameter at the center circumference to a smaller diameter on each side, with a corresponding form on the inside, as shown.

8. A wheel with wrought-metal spokes and a cast hub, in combination with a rim graduated on the face from a larger diameter at the center circumference to smaller diameters on each side of the center, and with a corresponding form on the inside and the sides extending inwardly, forming flanges, and cast with the rim in one piece, for the purpose specified.

9. A rim of a wheel with the sides extending inwardly, forming flanges, in combination with the face of the rim graduated from a larger diameter to a smaller diameter, and with a corresponding form on the inside, and all formed in one piece.

10. A traction-wheel with wrought-metal spokes and a cast hub, in combination with the sides of the rim extending inwardly, forming flanges, for the purpose specified, and the face of the rim graduated from a larger diameter to a smaller diameter, for the purpose specified, and with the annular ribs and grips cast on the face of the rim.

11. A traction-wheel with wrought-metal spokes and a cast hub, in combination with a rim with the sides extending inwardly, forming flanges, for the purpose specified, and the annular ribs and grips on the face of the rim, and all cast in one piece.

12. A traction-wheel with wrought-metal spokes and a cast hub, with the sides of the rim extending inwardly, forming flanges, for the purpose specified, and an annular rib on the face of the rim, and all cast together.

13. A wheel with wrought-metal crossed spokes and a cast hub with wrought-metal bands, as shown, in combination with the sides of the rim extending inwardly, forming flanges, for the purpose specified, and cast together with the rim in one piece.

14. A traction-wheel with wrought-metal crossed spokes and a cast hub, as shown and described, in combination with the annular ribs and grips on the face of the rim and all cast together with the rim in one piece.

15. A traction-wheel with wrought-metal spokes and a cast hub, in combination with an annular rib on the outside center circumference of the rim larger in diameter than the annular ribs on each side of the center circumference and on the face of the rim, and the grips between the annular ribs, as shown, and all cast together with the rim.

16. A traction-wheel with wrought-metal spokes and a cast hub, in combination with three or more annular ribs on the face of the rim and one annular rib larger in diameter than the rest, and with grips between the ribs, and all cast together with the rim.

17. A traction-wheel with wrought-metal spokes and a cast hub, in combination with two or more annular ribs larger in diameter than the other rib, and grips between the ribs and all cast together with the rim.

18. A traction-wheel with two annular ribs on the face of the rim and with one rib larger in diameter than the other and with the sides of the rim curved inwardly, in combination with the wrought-metal spokes and the hub.

19. A traction-wheel with several annular ribs on the face of the rim and with one rib larger in diameter than the rest, with the sides of the rim turned inwardly, and with the ribs and rim all cast together, in combination with the wrought-metal spokes and the hub.

20. A traction-wheel with one part of the outside of the rim larger in diameter, for the purpose specified, and with the inside made to correspond, with the grips and rim all cast together, in combination with the wrought-metal cross-tension spokes and the hub.

21. A traction-wheel with wrought-metal spokes and a cast hub, in combination with a rim graduated on the face from a larger diameter to a smaller diameter, with the sides extending inwardly, forming flanges, for the purpose specified, and with the inside made to correspond, and all cast together in one piece.

22. A traction-wheel with one part of the rim larger in diameter, for the purpose specified, and with one edge curved inwardly, and the annular rib on the face of the rim, in combination with the wrought-metal spokes and the hub.

JOHN DRIVER.

Witnesses:
BERTRAM E. ABER,
THOS. DRIVER.